United States Patent [19]

Shoup et al.

[11] Patent Number: 4,531,042
[45] Date of Patent: Jul. 23, 1985

[54] LARGE DIAMETER STUD AND METHOD AND APPARATUS FOR WELDING SAME

[75] Inventors: Thomas E. Shoup, Amherst; Dennis J. Maykut, Brook Park, both of Ohio; Thomas W. Eagar, Cambridge, Mass.

[73] Assignee: TRW Inc., Ohio

[21] Appl. No.: 542,423

[22] Filed: Oct. 17, 1983

[51] Int. Cl.³ ............................ B23K 9/20; B23K 9/08
[52] U.S. Cl. .......................................... 219/99; 219/98; 219/123
[58] Field of Search ............................ 219/98, 99, 123

[56] References Cited

U.S. PATENT DOCUMENTS

| | | | |
|---|---|---|---|
| 2,406,474 | 8/1946 | Perrin | 219/98 |
| 2,473,871 | 6/1949 | Edels | 219/123 |
| 2,474,531 | 6/1949 | Keir et al. | 219/99 |
| 2,761,955 | 9/1956 | Sholle | 219/99 |
| 2,817,001 | 12/1957 | Woodling | 219/123 |
| 3,037,109 | 5/1962 | Glover | 219/99 |
| 3,760,143 | 9/1973 | Rondeau et al. | 219/99 |

FOREIGN PATENT DOCUMENTS 1159389 7/1969 United Kingdom.
856712 8/1981 U.S.S.R. .................................. 219/99

*Primary Examiner*—Clifford C. Shaw
*Attorney, Agent, or Firm*—Allen D. Gutchess, Jr.

[57] ABSTRACT

A large diameter stud and a method and apparatus for welding same are provided. The large diameter stud has a protruding tip at a weldable end thereof containing a solid rod-like body of flux. A ceramic ferrule which can have a two-step cavity surrounds the weldable end portion of the stud when engaged with workpiece to which it is to be welded. An arc blow coil surrounds the ferrule and is spaced therefrom with powdered flux therebetween and above the ferrule. The arc blow coil is attached to adjustable legs of a welding tool and has a weight thereon to aid in supporting the welding tool upright on the workpiece during the welding operation. In the welding cycle, a relatively low weld current is used for the main welding arc and is maintained for an extended period of time. Current through the arc blow coil is initiated when the welding cycle begins and is gradually increased to a maximum at an intermediate point in the welding cycle.

25 Claims, 9 Drawing Figures

LARGE DIAMETER STUD AND METHOD AND APPARATUS FOR WELDING SAME

This invention relates to a large diameter stud and to a method and apparatus for welding the stud to a workpiece.

In a drawn-arc stud welding technique, a stud which is to be end welded to a workpiece is held in a chuck of a stud welding tool generally perpendicular to the workpiece and is pressed against the workpiece. A spark shield or ferrule is located around the weldable end portion of the stud and engages the surface of the workpiece, usually being carried in a welding foot which can be affixed to adjustable supporting legs mounted on the welding tool body. When the welding cycle is initiated, a solenoid coil in the tool is energized to draw a core into the coil. The core is connected to a chuck leg, which, in turn, is connected to the chuck which retracts the stud from the workpiece. At that time, a pilot arc is established between the stud and the workpiece and a main welding arc is subsequently imposed on the pilot arc. When the coil is deenergized, a plunge spring in the welding tool moves the core and the chuck leg toward the workpiece and moves the stud against the workpiece with the welding arc usually being maintained until the stud contacts the workpiece. Molten metal on the stud end and the workpiece quickly solidify to complete the weld.

The entire drawn arc stud welding cycle occurs in a fraction of a second for smaller studs and the longest cycle for larger studs has consumed less than two seconds. At the same time, high weld current has been employed, particularly for larger studs where current flow in the order of 2800–3000 amps has been common.

The present invention relates to welding large diameter studs, which are defined here as studs exceeding one inch in diameter and being as large as three inches in diameter. More specifically, most large diameter studs exceed one inch in diameter and are not more than about one and three-quarter inches in diameter. It is almost infinitely more difficult to obtain uniformly good welds with large diameter studs than it is with smaller ones, e.g. in the order of one-quarter to five-eighths inch in diameter. It is believed that the main reason for this is that the main welding arc is considerably less stable during the welding cycle for large diameter studs. With small studs, the welding arc, while it persists, stays in a relatively stable path between a center of the weldable end of the stud and the workpiece. With the larger studs, the welding arc can wander about the end of the stud, forming a continously movable path between the stud end and the workpiece. The arc can persist longer between one side or edge portion of the stud end and the workpiece than at other portions. This results, when the stud is welded, with a weld fillet of proper size and shape between one side portion of the stud and the workpiece and with another portion of the stud having a cavity where the fillet should exist.

The present invention is concerned with achieving consistently good welds with large diameter studs which is accomplished by maintaining stability of the main welding arc during the drawn arc welding cycle. It has been found that stability of the arc can be increased by employing lower weld currents for the welding arc and, at the same time, maintaining the welding arc during the weld cycle for a much longer period of time than heretofore. The stabilization is also increased by employing an arc blow coil around the stud and the ferrule. Current to the arc blow coil is supplied at the time the welding cycle is initiated and is slowly increased to a steady rate at an intermediate point in the welding cycle, after the main welding arc is initiated, to assure that the welding arc will not be extinguished.

It is important to maintain the area around the stud and workpiece free of air during the welding cycle to prevent oxidation and, consequently, severe weakening of the weld. The longer the weld cycle, the more difficult this is to accomplish. In accordance with the invention, obtaining an air-free weld is, in part, accomplished by an elongate or rod-like body of solid flux located in a bore in a tip of the stud. This elongate body of flux is consumed along with the tip and a portion of the weldable end of the stud during the welding cycle. The elongate shape of the flux body enables the flux to be consumed for a longer portion of the welding cycle. Further, the elongate body prevents or at least helps to prevent the flux body from being "blown" out of the end of the stud when the main welding arc persists. Round balls of flux have heretofore been used for small studs, as shown in Kurtz et al, U.S. Pat. No. 3,316,614 issued May 2, 1967, but are subject to the above deficiencies.

It has been found that the solid body of flux alone is insufficient to maintain an air-free atmosphere over the lengthy welding cycle. To overcome this, powdered flux is also placed around the sides and over the top of the ferrule which provides a further barrier to air and reacts with air around the weld area during the welding cycle. Much of this powdered flux can be reclaimed and reused for subsequent welding cycles.

Also in accordance with the invention, a two-step ferrule can be advantageously used, particularly with the larger diameter studs. The base of the ferrule must be of a sufficient diameter to not inhibit the formation of and yet shape the fillet of weld metal located around the end of the stud affixed to the workpiece. Upper portions of the ferrule can then be stepped in and reduced in diameter to reduce the overall size of the cavity around the stud formed by the ferrule. The reduced cavity size consequently reduces the amount of air in the weld area which must be consumed by the fluxes.

Also in accordance with the invention, the arc blow coil positioned around the ferrule preferably is affixed to the adjustable supporting legs which are part of the welding tool. The arc blow coil thereby aids in positioning the welding tool in an upright position during the weld cycle and provides a firm base against which the operator can hold the welding tool while the lengthy welding cycle is in process. Further in accordance with the invention, an annular weight can be mounted on top of the arc blow coil to further aid in holding the welding tool during the welding cycle, with less pressure than needed by the operator to hold the tool in place. The weight can be provided with an upper surface of generally inverted truncated conical configuration which facilitates the supplying of powdered flux to the area between the ferrule and the coil and also above the ferrule.

It is, a principal object of the invention to provide an improved method and apparatus for welding large diameter studs to workpieces.

Another object of the invention is to provide a method and apparatus for welding large diameter studs to workpieces with greater uniformity.

A further object of the invention is to provide an improved method for welding large diameter studs to workpieces using lower weld currents and longer welding cycles.

Yet a further object of the invention is to provide a method of welding large diameter studs including using an arc blow coil for stabilizing the welding arc and supplying current to the arc blow coil in a gradual manner during the early part of the welding cycle.

Still another object of the invention is to provide a large diameter stud having a welding tip and an elongate solid body of flux located in a bore in the tip.

Many other objects and advantages of the invention will be apparent from the following detailed description of preferred embodiments thereof, reference being made to the accompanying drawings, in which.

Figure 1:
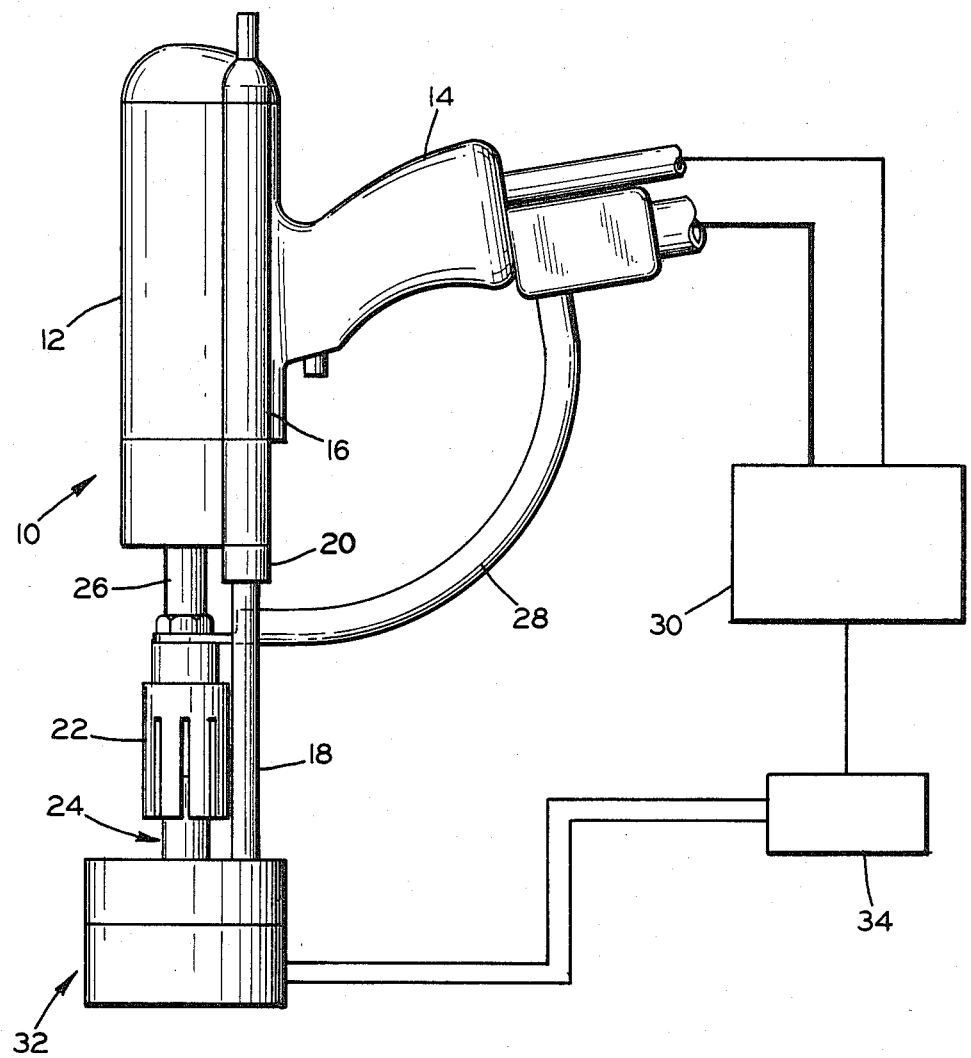
FIG. 1 is a somewhat schematic view in elevation of overall stud welding apparatus in accordance with the invention.

Referring to the drawings and particularly to FIG. 1, a heavy-duty welding gun employed with the invention is indicated at 10 and can be of the type shown in Shoup, U.S. Pat. No. 3,790,740 issued Feb. 5, 1974. The welding tool includes a main body or housing 12 of a dielectric material having an integral pistol grip 14 and two side tubes 16. Two supporting legs 18 are slidably held in the body tubes 16 and can be adjustably affixed therein by suitable nuts 20. A large chuck 22 holds an end of a large diameter stud 24 in accordance with the invention. The chuck 22 is affixed to a chuck leg 26 which extends into the housing to a solenoid core (not shown). The tool 10 also has a solenoid coil therein which, when energized, draws the core therein and retracts the chuck leg 26, the chuck 22, and the stud 24 from the workpiece. Welding current is supplied to the rear of the chuck 22 through a heavy conductor 28 and the welding current is supplied and the welding cycle is controlled by a power supply and control unit 30. Current for an arc blow control coil assembly 32, located around the weldable end of a stud 24 is supplied and controlled by a control unit 34. The unit 34 can be coordinated with the power supply and control unit 30 or the current to the coil can be controlled manually.

Figure 2:
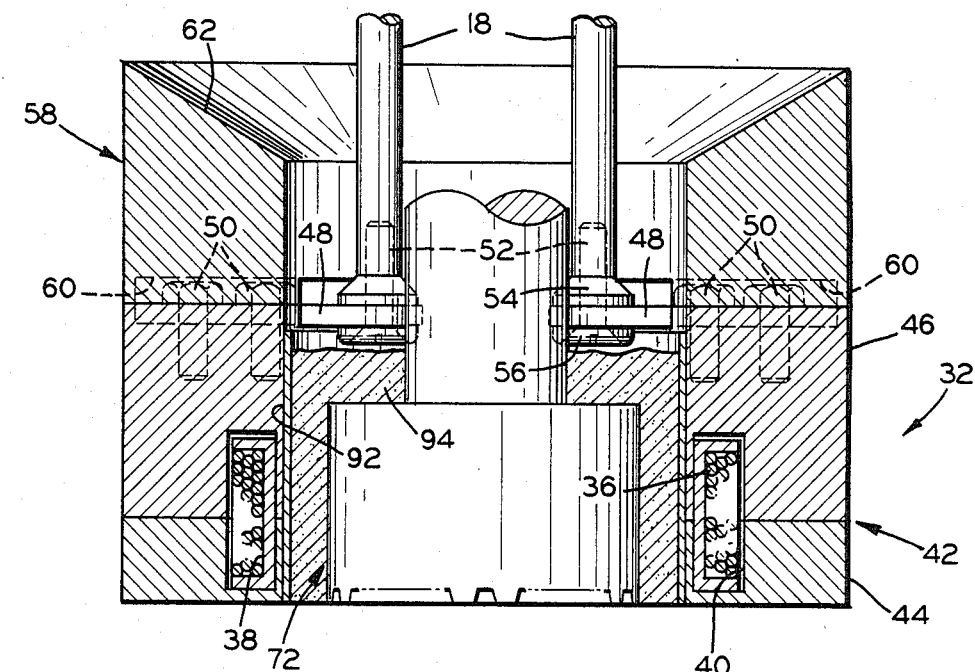
FIG. 2 is a view in vertical section taken through an arc blow coil of the apparatus of FIG. 1.
Figure 4:
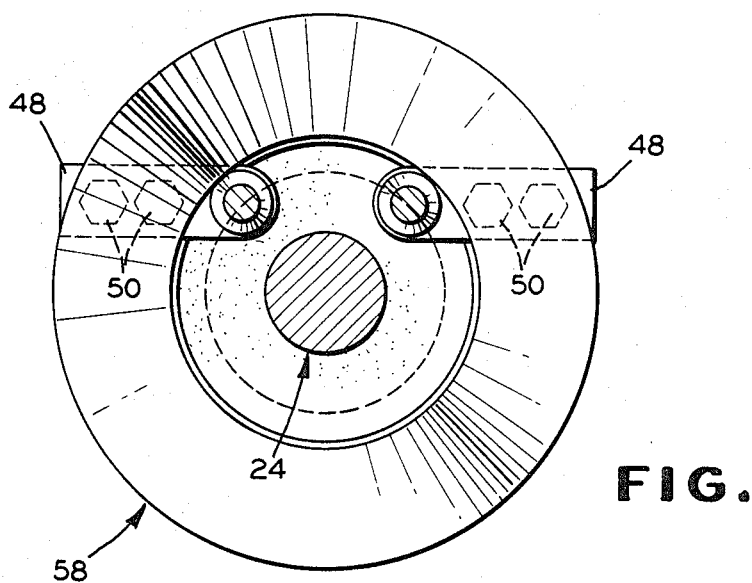
FIG. 4 is a plan view of the components of FIG. 2.
Figure 5:
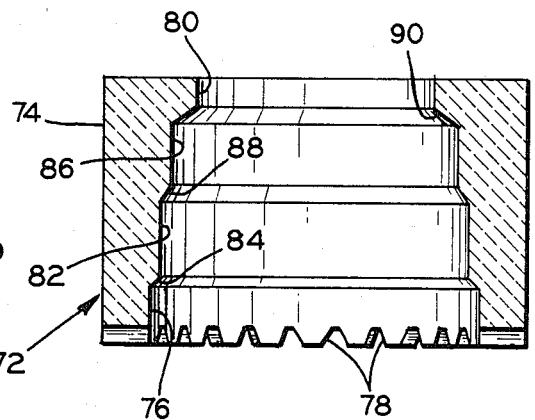
FIG. 5 is an enlarged view in cross section taken through the ferrule.
Figure 6:
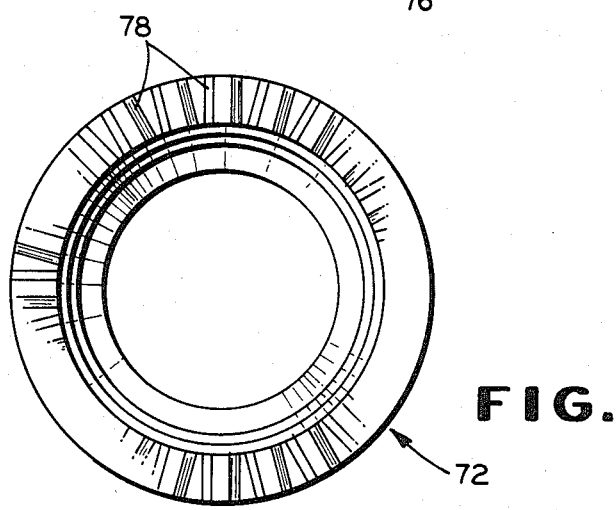
FIG. 6 is a bottom view of the ferrule of FIG. 5.

The arc blow control coil assembly 32 is shown in more detail in FIG. 2. This includes a coil 36 of a number of turns of wire, e.g. 500 turns of number 26 wire. The wire can be located on a spool 38 in a cavity 40 of a housing 42. The housing includes a lower part 44 and an upper part 46 suitably fastened together and is made of metal, thereby intensifying the magnetic field established by the coil. In accordance with the invention, the arc blow coil assembly 32 is attached to the ends of the adjustable legs 18 of the welding tool 10. This enables the coil assembly 32 to serve as a support for the welding tool 10 during the long welding cycle and maintains the welding tool in an upright position during that time. As shown, the adjustable legs 18 are attached to the coil assembly 32 by a pair of tabs 48 which are affixed to the upper housing part 46 by machine screws 50 (FIGS. 2 and 4) with the tabs extending inwardly of the housing 42. The tabs have inner openings through which machine screws 52 extend and are threaded into the ends of the legs 18. Washers 54 and 56 are located on either side of the tabs 48.

Also in accordance with the invention, a cylindrical weight 58 of solid metal is located on the coil housing 42. This further aids in holding the welding tool 10 in place during the welding cycle so that less downward pressure is required on the welding tool by the operator. The weight has the same outer and inner diameters as the housing 42 and has recesses 60 in the lower surface thereof to receive the heads of the machine screws 50. The recesses and screw heads also aid in positioning the weight 58 on the housing 42. An upper surface 62 of the weight 58 is preferably of inverted truncated conical shape. This facilitates the supply of powdered flux around a ferrule as will be discussed subsequently.

Figure 3:
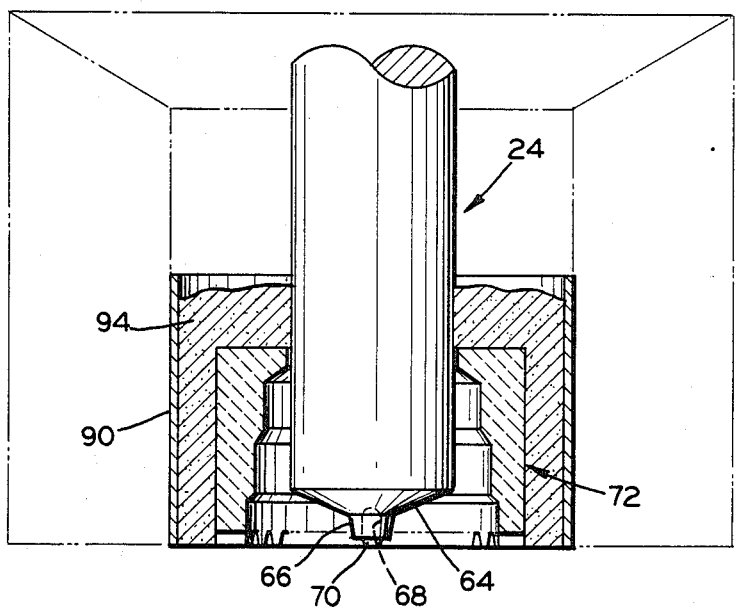
FIG. 3 is a view similar to FIG. 2 but specifically showing a stud, ferrule, and powdered flux.

Referring to FIG. 3, the large diameter stud 24 has a main truncated conical end 64 extending at an angle of about 22° to the horizontal. The end 64 terminates centrally in a tip 66 which projects beyond the end 64 and burns back quickly during the welding cycle. Thus, for example, a three-eighths inch arc length can be obtained with only one-eighth inch of lift. The arc is less likely to be extinguished since the arc length extends relatively gradually to three-eighths inch in length as the tip burns back, rather than extending to the full length abruptly when the stud is lifted. In accordance with the invention, the tip 66 has a bore 68 centrally located therein which extends to the base of the tip 66 or slightly therebeyond into the stud end 64. A solid, elongate or rod-like body 70 of flux is pressed into the bore 68 and projects slightly beyond the tip. This flux can be aluminum which reacts with air in the vicinity of the weld. The elongate nature of the flux enables it to be consumed during a longer portion of the welding cycle and also helps achieve a more stable arc. The elongate nature of the flux body also reduces the possibility of being blown out of the bore 68 during the welding cycle, as has heretofore occurred with balls of flux.

A ceramic ferrule 72 is positioned on the workpiece around the weldable end of the stud prior to the welding cycle. The stud 72 is of fired ceramic material and has an outer cylindrical surface 74 with a lower inner cylindrical portion 76 of a size to help shape the fillet of weld metal at the end of the welding cycle. A plurality of notches or vents 78 are located radially around the lower end of the ferrule through which gases are exhausted particularly during the initial part of the welding cycle. Gases are also exhausted through a smaller upper cylindrical portion or neck 80 of the ferrule around the stud 24, particularly during the latter part of the welding cycle. The diameter of the upper portion 80 of the ferrule slightly exceeds the diameter of the stud while the diameter of the lower portion 76 is dictated by the size of the weld fillet. Between the two portions 76 and 80, it has been found desirable to reduce the volume of the cavity within the ferrule so as to reduce the amount of air therein and, consequently, the amount of elongate flux which must be used to prevent contamination of the weld metal. Accordingly, the ferrule 72 has a second cylindrical portion 82 immediately above the lower portion 76 of smaller diameter, forming a step 84 therebetween which also shapes the upper edge of the weld fillet. Further, the ferrule 72 has a third cylindrical portion 86 of smaller diameter than the portion 82 to form a second step 88 therebetween, reducing the volume around the stud 24 accordingly, with the widths of the three cylindrical portions 76, 82, and 86 being substantially equal. An additional step 90 is formed between the third portion 86 and the upper portion or neck 80 of the ferrule.

A cylindrical wall or sleeve 92 is positioned around the ferrule 74 immediately inside of the coil housing 42. The inner diameter of the sleeve 92 exceeds the diameter of the outer surface 74 of the ferrule 72 to provide an annular gap or space therebetween, at least about $\frac{1}{4}$th inch. Powdered metal flux 94 is supplied through opening in the weight 58 to the annular space, filling that space and extending well above the top of the ferrule, at least about $\frac{3}{8}$ths inch. The flux 94 provides a barrier against entry of air into the ferrule cavity during the welding cycle and also the inner portion of the flux 94 reacts with oxygen which may be present. The powdered flux 94 preferably is of aluminum and is sufficiently coarse so as not to enter the ferrule cavity through the notches 78 or the neck 80.

Figure 7:
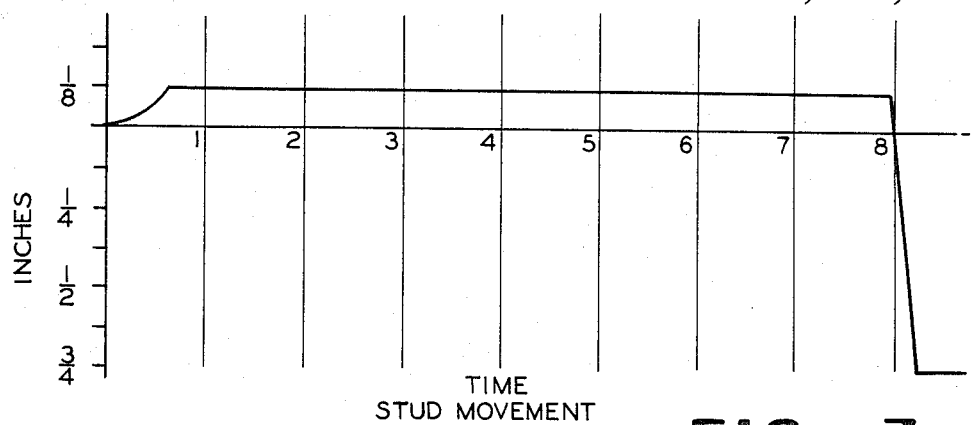
FIG. 7 is a graph showing stud movement during a welding cycle in accordance with the invention.
Figure 8:
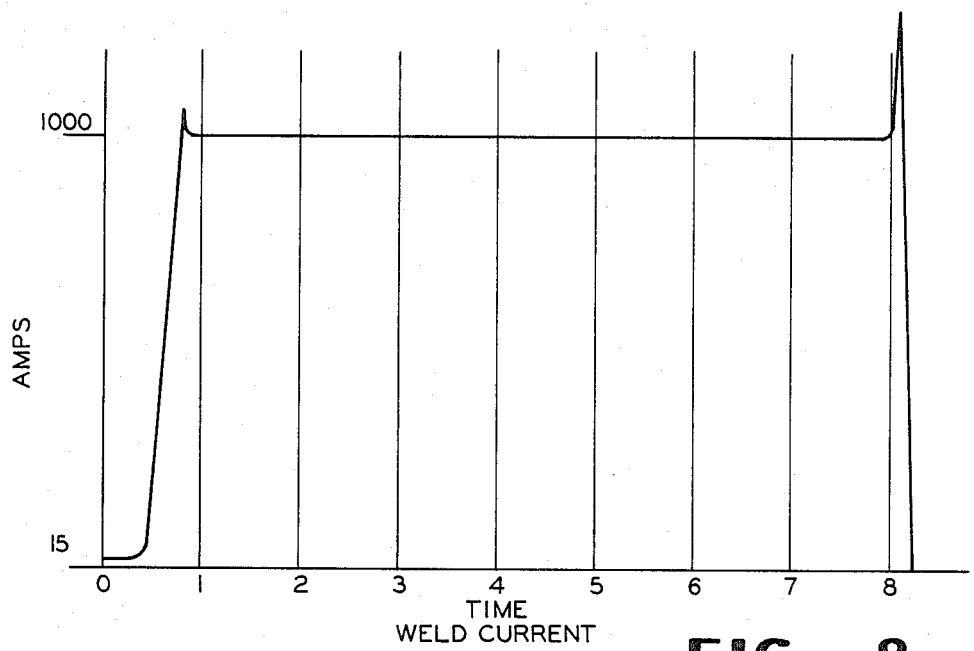
FIG. 8 is a graph showing weld current during the welding cycle.
Figure 9:
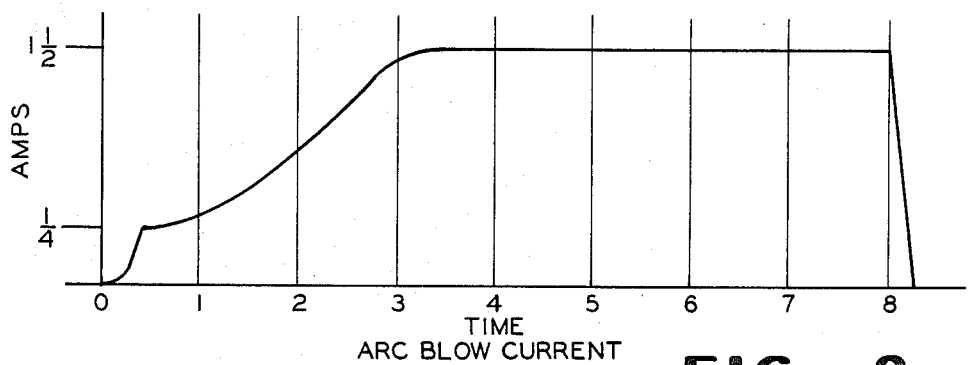
FIG. 9 is a graph showing current for the arc blow coil during the welding cycle.

In the welding cycle for the stud 24, with a diameter of $1\frac{1}{4}$ to $1\frac{1}{2}$ inch, reference being made to FIGS. 7-9, the stud is first positioned as shown in FIG. 3 in contact with the workpiece. The stud is then lifted by the welding tool 10, typically about $\frac{1}{8}$th to 3/16ths inch for a $1\frac{1}{4}$th inch diameter stud. As the stud is lifted, a pilot arc is established between the tip of the stud and the workpiece with this pilot arc typically drawing ten to fifteen amps and persisting for a period of about 60 milliseconds, $1\frac{1}{2}$ to two times the length of a conventional pilot arc. As the welding cycle is initiated, power is also supplied to the arc blow control coil 36, with the initial current being in the order of $\frac{1}{8}$ amp and then gradually increasing to about $1\frac{1}{2}$ amps or about 600-800 ampere turns at an intermediate point in the welding cycle, about one fourth to one half of the cycle time after the stud is lifted, where it is maintained during the remainder of the welding cycle. With a welding cycle of about eight to ten seconds, the maximum coil current is reached in three to four seconds. After the pilot arc, main welding current is supplied to the stud and the workpiece, with this current being 900-1300 and preferably 1000-1200 amps as compared to about 2800 amps heretofore used in attempts to weld larger studs. The main welding arc lengthens gradually as the tip 66 burns back so that there is less chance for the arc to be extinguished especially with the arc blow coil 36 being used.

Various modifications of the above-described embodiments of the invention will be apparent to those skilled in the art and it is to be understood that such modifications can be made without departing from the scope of the invention, if they are within the spirit and the tenor of the accompanying claims.

We claim:

1. In a method of welding a stud to a workpiece, the stud having a welding tip at one end with flux in the tip, said method comprising positioning the stud substantially vertically to a workpiece with the tip in contact with the workpiece, positioning an arc blow coil around the stud, lifting the stud from the workpiece and imposing a voltage between the stud and the workpiece to establish a pilot arc therebetween, imposing a higher voltage between the stud and the workpiece to establish a main welding arc therebetween, and plunging the stud against the workpiece a period of time after the stud is lifted, the improvement comprising supplying low current to the arc blow coil substantially at the time the stud is lifted, and increasing the current to the arc blow coil gradually to a maximum in about one-fourth to one-half of the total weld cycle time after the stud is lifted.

2. A method according to claim 1 characterized by the improvement further comprising plunging the stud against the workpiece from seven to eleven seconds after the stud is lifted and increasing the arc blow current to the maximum about three to four seconds after the stud is lifted.

3. A method according to claim 1 characterized by the improvement further comprising establishing the main welding arc with a current from 900-1300 amps and increasing the current to the arc blow coil to a maximum of 600-800 ampere-turns.

4. A method according to claim 3 characterized by the improvement further comprising establishing the pilot arc and main welding arc for a total time of seven to eleven seconds.

5. A method of welding a stud having a diameter from one and one-quarter to one and one-half inches, said method comprising positioning the stud substantially vertically with respect to a workpiece with a tip in contact with the workpiece, lifting the stud from the workpiece and imposing a voltage between the stud and the workpiece to establish a pilot arc therebetween, subsequently imposing a higher voltage between the stud and the workpiece to establish a main arc therebetween with current from 700-1300 amps, and plunging the stud against the workpiece from seven to eleven seconds after the stud is lifted.

6. A method according to claim 5 characterized by positioning an arc blow coil around the stud, supplying low current to the coil substantially at the time the stud is lifted, and gradually increasing the current to 600-800 ampere-turns after the main welding arc is established.

7. A method according to claim 6 characterized by establishing the main welding arc within about one second after the stud is lifted and increasing the current to the arc blow coil to 600-800 ampere-turns about three to four seconds after the stud is lifted.

8. A method according to claim 6 characterized by stopping the flow of current to said arc blow coil about the time the stud is plunged against the workpiece.

9. Apparatus for welding a large diameter stud to a workpiece, said apparatus comprising, in combination, a large diameter stud having a tip centrally located at a weldable and thereof, said tip having a central bore, a rod-like body of flux in said bore and extending from said tip, a ferrule positioned around the weldable end portion of the stud, an arc blow coil positioned around said ferrule, wall means larger than said ferrule positioned around said ferrule to form a gap therebetween, a powered flux in said gap around and above said ferrule and being contained by said wall means.

10. Apparatus according to claim 9 characterized by a housing containing said arc blow coil, and a weight positioned on said arc blow coil to aid in holding the apparatus in place during a welding cycle.

11. Apparatus according to claim 10 characterized by said weight having an inverted truncated conical surface to facilitate supplying powdered flux to said gap around and above said ferrule.

12. Apparatus according to claim 9 characterized by a welding tool having adjustable legs extending forwardly thereof, and means attaching said adjustable legs to said arc blow coil.

13. Apparatus for welding a large diameter stud to a workpiece comprising a ceramic ferrule adapted to receive an end portion of the stud and having a generally cylindrical outer surface, an arc blow coil positioned around said ferrule and having a generally cylindrical wall extending upwardly beyond said ferrule with an inner diameter exceeding the outer diameter of said ferrule to form an annular gap therebetween, and a powdered flux in said gap around and above said ferrule and being contained by said cylindrical wall.

14. Apparatus according to claim 13 characterized by said gap having a width of at least one-quarter inch and said powdered flux extending above said ferrule at least three-eighths inch.

15. A ferrule for aiding in the welding of large diameter studs to a workpiece, said ferrule comprising a structurally-integral body of ceramic material, said body having an outer cylindrical surface, said body having a lower inner cylindrical portion at an end thereof, the end of said ferrule having a plurality of notches extending from the outer cylindrical surface to the lower inner cylindrical portion, said ferrule having a neck of a diameter slightly larger than the stud to be welded at the end opposite the notches, said ferrule having a second, inner cylindrical portion immediately above said lower cylindrical portion and of smaller diameter, said ferrule having a third inner cylindrical portion immediately above said second cylindrical portion and of smaller diameter, said third cylindrical portion also being of a diameter larger than that of said neck.

16. A ferrule according to claim 15 characterized by said lower cylindrical portion, said second cylindrical portion, and said third cylindrical portion being of generally equal widths.

17. Apparatus for welding a large diameter stud to a workpiece comprising a ceramic ferrule adapted to receive an end portion of the stud and having a generally cylindrical outer surface, said ceramic ferrule having a plurality of notches in an end thereof adapted to contact the workpiece and having a neck in the opposite end thereof of a diameter larger than the diameter of the stud to be welded, said ferrule having a lower inner cylindrical portion at the notches, a second cylindrical portion immediately above said lower portion and of smaller diameter, and a third cylindrical portion immediately above the second cylindrical portion and of a smaller diameter, said third cylindrical portion being larger in diameter than said neck, an arc blow coil positioned around said ferrule and having a generally cylindrical wall extending upwardly beyond said ferrule with an inner diameter exceeding the outer diameter of said ferrule to form an annular gap therebetween, and a powdered flux in said gap and above said ferrule and being contained by said cylindrical wall, said powdered flux being sufficiently coarse so as to not appreciably enter the notches or space between said ferrule neck and the stud.

18. Apparatus for welding studs comprising a stud welding tool having a moveable chuck leg extending therefrom, a chuck affixed to said chuck leg and moveable therewith for holding an end of a stud with a weldable end of the stud initially in contact with a workpiece, a ceramic ferrule adapted to receive the weldable end of the stud when in contact with the workpiece, adjustable legs extending outwardly from said tool and generally parallel to said chuck leg, a coil of wire positioned to extend around the end of the stud in contact with the workpiece, a housing for said coil with an inner surface of said housing spaced outwardly from said ferrule to form an annular gap therebetween around said ferrule, and means affixing said housing to said adjustable legs independently of said ferrule.

19. Apparatus according to claim 18 characterized by said welding tool having two of said adjustable legs and said means affixing said housing to said legs comprising two tab means affixed to an upper portion of said housing and extending inwardly into a central opening in said housing, and means affixing said tab means to the ends of said legs.

20. Apparatus according to claim 18 characterized by a weight mounted on top of said housing and having a central opening through which the stud can extend.

21. Apparatus according to claim 20 characterized by an upper surface of said weight sloping inwardly and downwardly toward the weight opening.

22. Apparatus for welding large diameter studs comprising a stud welding tool, said tool having moveable means for holding one end of a stud, a coil of wire positioned to extend around a weldable end of a stud when the stud is in a welding position against a workpiece, a ferrule positioned around the weldable end of the stud when in welding position, a housing for said coil, said housing having a central opening through which the stud can extend to the workpiece, with an inner surface of said housing spaced outwardly from said ferrule to form an annular gap therebetween around said ferrule, means adjustably connecting said housing to said tool independently of said ferrule, and a weight mounted on top of said housing and having a central opening through which the stud can extend, said weight aiding in holding the tool in place during a welding cycle.

23. Apparatus according to claim 22 characterized by an upper surface of said weight being of generally inverted truncated conical shape.

24. Apparatus according to claim 22 characterized by an upper surface of said weight sloping downwardly and inwardly to the central opening of said weight.

25. Apparatus for welding a large diameter stud to a workpiece, said apparatus comprising, in combination, a large diameter stud having a tip centrally located at a weldable and thereof, said tip having a body of flux extending therefrom, a stud welding tool having a movable chuck leg extending therefrom, a chuck affixed to said chuck leg and movable therewith for holding the end of the stud opposite the weldable end, a ceramic ferrule adapted to receive the weldable end portion of the stud and having a generally cylindrical outer surface, an arc blow coil positioned around said ferrule, a housing containing said arc blow coil and having a generally cylindrical wall spaced around said ferrule and independent of the ferrule with an inner diameter of said cylindrical wall exceeding the outer diameter of said ferrule to form an annular gap therebetween, said generally cylindrical wall extending upwardly beyond said ferrule, adjustable leg means extending outwardly from said tool and generally parallel to said chuck leg, means connecting said adjustable leg means to said housing to enable the housing and the leg means to move together, and powdered flux in said annular gap around and above said ferrule and being contained by said generally cylindrical wall.

* * * * *

UNITED STATES PATENT OFFICE
CERTIFICATE OF CORRECTION

PATENT NO. : 4,531,042
DATED : July 23, 1985
INVENTOR(S) : Thomas E. Shoup, Dennis J. Maykut and Thomas W. Eagar It is certified that error appears in the above-identified patent and that said Letters Patent are hereby corrected as shown below:

Claim 25, line 4, "and" should be --end--.

Signed and Sealed this

Twenty-second Day of October 1985

[SEAL]

Attest:

Attesting Officer

DONALD J. QUIGG

*Commissioner of Patents and Trademarks—Designate*